Figure 1:
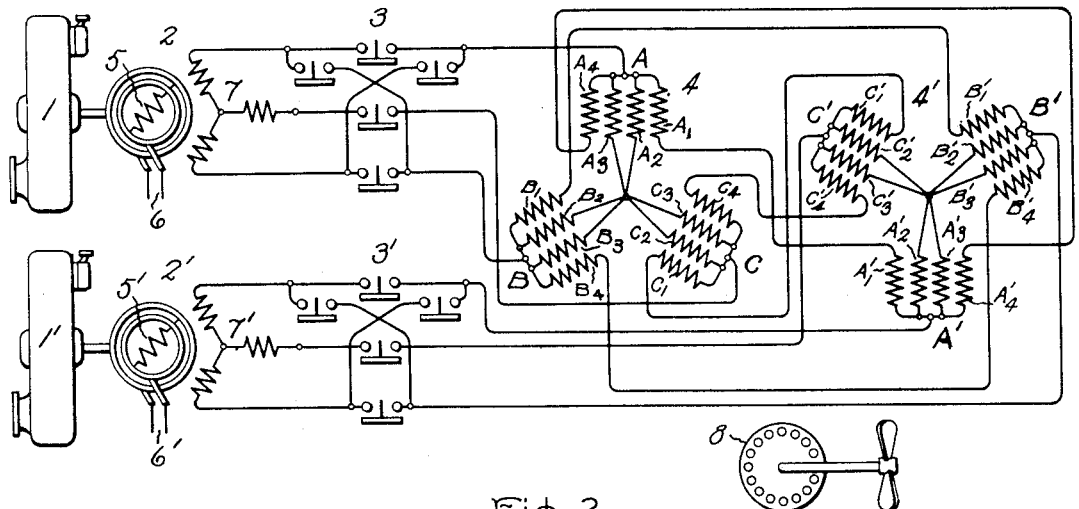

Feb. 17, 1925.

C. MACMILLAN

ELECTRIC SHIP PROPULSION

Filed Oct. 27, 1923

Inventor:
Campbell Macmillan,
by Alexander F. Lentz
His Attorney.

Patented Feb. 17, 1925.

1,526,755

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ELECTRIC SHIP PROPULSION.

Application filed October 27, 1923. Serial No. 671,258.

*To all whom it may concern:*

Be it known that I, CAMPBELL MACMILLAN, a citizen of the United States, residing at Schenectady, in the county of Schenectady, State of New York, have invented certain new and useful Improvements in Electric Ship Propulsion, of which the following is a specification.

My invention relates to power systems wherein a plurality of generators are provided for supplying current to a motor operatively associated with a load device, and has for its object the provision of an improved means for reducing or obviating the difficulties encountered in supplying electric current to a motor from a plurality of generators driven by prime movers subject to variation in their speed and driving torque.

While my invention has marked advantages when utilized in connection with electric ship propulsion systems, it will be apparent that it is generally useful in power systems comprising a motor supplied with current from two or more generators.

In a copending application, Ser. No. 624,247, filed March 10, 1923, I have disclosed a power system wherein a plurality of generators are provided for supplying current to a motor having its primary winding arranged in sections each adapted to receive current from a different generator. As pointed out in the copending application, it has been found desirable in the application of the high speed Diesel engine to ship propulsion to generate the power in several units of moderate size for the purpose of securing greater flexibility in the installation of the system and for the further purpose of increasing the reliability of its operation. It is desirable, however, to avoid parallel operation of the generators when they are turbine driven and the parallel operation of generators driven by Diesel engines is still more objectionable. In the majority of cargo boats it is desirable to have one large propeller and, if this propeller is to be driven by a single motor of suitable size, the provision of means for avoiding the objections incident to the parallel operation of the generators becomes very important.

The main objection to direct parallel operation is due to the magnitude of the circulating currents which are caused by speed variations of the different generators and by the relative mechanical phase displacement of the different generator rotors even before any actual difference in speed is established. If two or more generators are operated in parallel and for any reason the speed of one is momentarily decreased there is produced a resultant electromotive force which sends a circulating current around the closed circuit formed by the parallel connected machines. This circulating current increases the load on the machines operating at normal speed and lightens the load on the low speed machine thereby tending to equalize the speeds of the various machines and to reduce the circulating current to zero. Due, however, to the inertia of the machines, they will swing beyond the position of no circulating current, which current will then be reversed and will tend to pull the two machines together again. The frequency of this swinging or hunting will be determined by the natural period of vibration of the machines and it may be greatly reduced by eddy currents in the pole faces, by the provision of damper windings and by the damping effect of the field windings. These circulating currents, however, also depend on the relative mechanical phase displacement of the different generator rotors and attain large values before any actual difference of speed is established. It therefore becomes necessary to provide means which operate independently of speed variations to eliminate the circulating currents.

By arranging the motor primary winding in sections each operatively associated with a different generator, direct circulating currents are eliminated and the variations in current in the different circuits, while in some respects equivalent to such circulating currents, are not established by phase displacement but require a definite change in the relative speed of the independent generators before any large changes of current can take place. There is in this case little tendency to accelerate any particular generator and engine or turbine which may fail to furnish its full share of the load. Such a generator will merely continue to supply power at a somewhat lower frequency and this will correspond to a slightly smaller slip in the corresponding section of the motor which continues to rotate at practically the same speed, but receives a smaller contribution to its total torque from the section under consideration. If this difference of frequency continues, the relative spacing of the motor poles is affected, and at the border of two adjacent sections of the motor stator winding the joint magnetomotive force per ampere of the two adjacent sections will undergo a periodic variation from zero to normal value. The periodicity of this magnetomotive force is largely dependent upon the difference of the slip frequency in the adjacent sections.

The variations due to difference in the frequency of the current supplied to the different sections of the motor primary winding have been found to introduce no serious difficulties unless the winding comprises a large number of sections with very few poles connected in series. In such case the overlapping portions comprise a very considerable percentage of the entire winding and the operation of the system is unfavorably affected by the wide variations in the value of magnetomotive force and effective reactance per slot at these portions. In accordance with my present invention this difficulty is minimized by interconnecting the corresponding overlapping coils in similar phases of adjacent sections and supplying current to the adjacent sections from polyphase generators which have their field displaced by 180 electrical degrees. With the arrangement just described the corresponding overlapping coils are connected in series between generator leads normally operated at voltages 180 electrical degrees out of phase and the overlapping coils have applied to them the same voltage as that applied to the remaining coils of the section. The magnetomotive force at the overlapping parts of the sections is thus limited to the normal operating value since any departure of the generators from their normal phase relationship must necessarily result in a decrease of voltage which compensates for the decrease in effective reactance per slot.

My invention will be better understood on reference to the following description considered in connection with the accompanying drawing and its scope will be pointed out in the appended claims.

Figure 2:
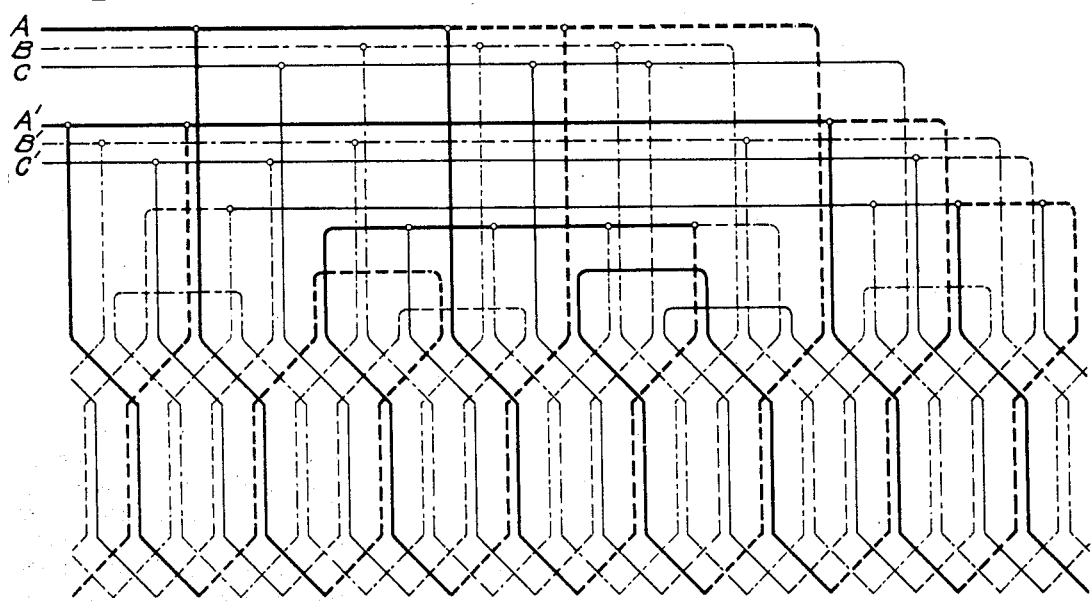

Referring now to the drawing, Fig. 1 shows a system of ship propulsion in which my invention has been embodied, and Fig. 2 shows the arrangement and connections of the motor winding illustrated in Fig. 1.

Fig. 1 shows two prime movers 1 and 1' coupled to polyphase generators 2 and 2' respectively arranged to supply current through switches 3 and 3' to sections 4 and 4' of the propeller motor which may be either an induction or synchronous machine. The switches 3 and 3' are arranged to serve the double purpose of reversing the phase relation between the generators and motors and of interrupting the connections therebetween. The motor is provided with a secondary winding 8 illustrated as of the squirrel cage type. It is of course obvious that in the case of an induction motor a secondary winding of the squirrel cage or phase wound type may be provided and that a synchronous motor will be wound not only to provide induction motor characteristics but also to permit of direct current excitation.

The generators 2 and 2' are provided with field windings 5 and 5' respectively arranged to be supplied with current from the direct current supply circuits 6 and 6' and with polyphase windings 7 and 7' connected with different sections of the motor winding. The phases A, B, and C of the section 4 are provided with coils $A_1$ to $A_4$, $B_1$ to $B_4$ and $C_1$ to $C_4$ respectively and the phases A', B' and C' of section 4' are likewise provided with coils $A_1'$ to $A_4'$, to $B_1'$ to $B_4'$ and $C'$ to $C_4'$. The generator fields windings 5 and 5' are arranged normally to produce two 3 phase current systems displaced by 180 electrical degrees. Under normal conditions therefore phase A of section 4 is reversed with respect to phase A' of section 4', phases B and B' are likewise opposed and phase C is opposed to phase C'. Since the generators 2 and 2' are independently driven this phase relationship is as favorable as any other and has the advantage that it permits connection of the overlapping marginal coils in series between the positive phase terminal of one generator and the negative terminal of the other generator.

Thus, assuming phase A to be positive and phase A' to be negative, coils $A_1$ and $A_1'$ may be connected in series between phases A and A', and so long as the generators 2 and 2' remain in normal phase relationship there is applied to the series connected coils $A_1$ and $A_1'$ a voltage of twice the value of the generator phase voltage. The marginal coils $A_1$ and $A_1'$ which are at one junction between two sections therefore have impressed upon each of them a voltage the same as that impressed on the coil $A_2$, for example, which is connected directly from the A phase of generator 2 to neutral. In the phases A and A' the marginal coils $A_4$ and $A_4'$ at the other junction of the sections are likewise connected in series between the phases A and A'. The connections of the marginal coils in phases B and B' and in phases C and C' are similar to those of phases A and A' described above as will appear more clearly upon consideration of Fig. 2.

Fig. 2 shows the connections of the coils in sections 4 and 4' of the winding, and indicates the arrangement of these coils in the slots of the motor armature. In this figure, A, B and C represent the connections to the generator 2 and A', B' and C' indicate the connections to the generator 2'. Since the generators 2 and 2' are arranged to generate polyphase voltages displaced by 180 electrical degrees, A' must be considered to be negative when A is positive and similar relations must exist between B and B', and C and C' respectively. The two rows of letters at the top of the figure relate to the coil leads and are arranged to indicate the section, the coil, and the side of the coil to which each lead is connected. It is necessary to consider the coil side directly connected to A, B, or C as positive and the other side of the coil as negative, and to consider the coil side directly connected to A', B' or C' as negative and the other side of the coil as positive. The letter $\overline{C}'$ therefore indicates that the lead beneath it is connected directly to phase C' of generator 2'. The lead to the other side of the coil is indicated by the letter C'. The letter A indicates that the lead beneath it is connected directly to the phase A. The lead to the opposite side of the coil to which lead A is connected is indicated by the letter $\overline{A}$. The right hand lead is in each case indicated by the top letter. The upper two rows of letters at the bottom of the figure relate to the arrangement of the conductors in the slots. These conductors are designated in the same manner as the coil leads. The junction between conductors of different sections is indicated by a Z-shaped line as will be apparent on reference to the drawing. The bottom row of letters is arranged to indicate the location of the coils and the section to which the coils belong.

At the left hand junction of sections 4 and 4' the marginal coils are $A_1'$, $B_1'$ and $C_1'$ in section 4' and $A_1$, $B_1$ and $C_1$ in section 4. The coils $A_1$ and $A_1'$ are connected in series between phases A and A' through lead A, coil $A_1$, lead $\overline{A}$, lead A', coil $A_1'$, and lead $\overline{A}'$. The coils $B_1$ and $B_1'$ are connected in series between phases B and B' through lead B, coil $B_1$, lead $\overline{B}$, lead B', coil $B_1'$ and lead $\overline{B}'$. The coils $C_1$ and $C_1'$ are connected in series between phases C and C' through lead C, coil $C_1$, lead $\overline{C}$, lead C', coil $C_1'$ and lead $\overline{C}'$. At the right hand junction of the sections the marginal coils are $A_4$, $B_4$ and $C_4$ in section 4, and $A_4'$, $B_4'$ and $C_4'$ in section 4'. The arrangement of these coils will be apparent from what has been said in connection with the marginal coils at the left hand junction of the sections 4 and 4'. While only two sections have been shown it is of course apparent that any even number of sections may be provided.

So long as the generators are operated to produce polyphase systems displaced from each other by 180 electrical degrees both the marginal and other coils have impressed upon them voltages equal to the terminal voltage of the generator as previously explained. If the generators depart from normal phase relationship, the value of the voltage impressed on the series connected marginal coils will decrease until the generators are in phase with each other. Since the maximum value of the magnetomotive force is merely the normal operating value no difficulties can arise by reason of abnormal flux values, and the amplitude of the variation of magnetomotive force is also greatly reduced being now confined between the limits of normal value and zero.

I have explained my invention by illustrating and describing a certain specific embodiment thereof, but it will be readily understood by those skilled in the art that the invention may be embodied in many other forms than that shown and described. I, accordingly, do not wish to be restricted to the particular form of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. An electric power system wherein a plurality of independently driven generators are provided for supplying current to a load motor having a winding arranged in sections each adapted to receive current from a different one of said generators, characterized by the fact that said sections are interconnected to limit to its normal value the magnetomotive force at the junction between two sections of said motor winding, whereby fluctuations in the value of said magnetomotive force due to change in the phase relationship of said generators are reduced.

2. An electric power system comprising a motor having coils grouped in sections overlapping at their adjacent edges, a plurality of generators each arranged to supply current to a different one of said sections, and means for connecting the overlapping coils of adjacent sections between a terminal of the generator from which current is supplied to one of said adjacent sections and a terminal of the generator from which current is supplied to another of said adjacent sections.

3. An electric ship propulsion system comprising a polyphase motor having coils grouped in sections overlapping at their adjacent edges, polyphase generators arranged in phase opposition for supplying current to adjacent sections, and means for connecting the overlapping coils in similar phases of said adjacent sections in series between the opposed phases of said generators.

4. An electric ship propulsion system comprising a motor having a winding provided with coils grouped in sections with corresponding phases subject to relative displacement overlapping at their adjacent edges, a plurality of generators each having a number of phases equal to the total number of relatively displaced phases divided by the number of sections in said motor winding and each arranged to supply current to a different one of said sections, the generators which supply current to adjacent sections being arranged to produce polyphase systems displaced in phase by 180 electrical degrees and means for connecting the overlapping coils in similar phases of said adjacent sections between the opposed phases of said generators.

In witness whereof, I have hereunto set my hand this 26th day of October, 1923.

CAMPBELL MACMILLAN.